US012620226B2

(12) United States Patent
Zhong

(10) Patent No.: US 12,620,226 B2
(45) Date of Patent: May 5, 2026

(54) METHOD AND DEVICE FOR DETECTING VIOLATIONS

(71) Applicant: BOE TECHNOLOGY GROUP CO., LTD., Beijing (CN)

(72) Inventor: Pan Zhong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 339 days.

(21) Appl. No.: 18/258,312

(22) PCT Filed: Mar. 28, 2022

(86) PCT No.: PCT/CN2022/083516
§ 371 (c)(1),
(2) Date: Jun. 19, 2023

(87) PCT Pub. No.: WO2023/184123
PCT Pub. Date: Oct. 5, 2023

(65) Prior Publication Data
US 2024/0386719 A1 Nov. 21, 2024

(51) Int. Cl.
G06V 20/40 (2022.01)
G06T 7/11 (2017.01)
(Continued)

(52) U.S. Cl.
CPC .............. G06V 20/44 (2022.01); G06T 7/11 (2017.01); G06V 10/26 (2022.01); G06V 20/52 (2022.01); G06V 2201/07 (2022.01)

(58) Field of Classification Search
CPC ........ G06V 10/26; G06V 10/25; G06V 20/44; G06V 20/52; G06V 2201/07; G06T 7/11;
(Continued)

(56) References Cited

U.S. PATENT DOCUMENTS

2012/0020518 A1* 1/2012 Taguchi .................. G06T 7/292
382/103
2013/0266187 A1 10/2013 Bulan et al.

FOREIGN PATENT DOCUMENTS

CN 110648352 A 1/2020
CN 110747611 A 2/2020
(Continued)

OTHER PUBLICATIONS

Qin, Ran, et al. "MRDet: A multihead network for accurate rotated object detection in aerial images." IEEE Transactions on Geoscience and Remote Sensing 60 (2021): 1-12. (Year: 2021).*
(Continued)

*Primary Examiner* — Gregory A Morse
*Assistant Examiner* — Stefano Anthony Dardano
(74) *Attorney, Agent, or Firm* — XSENSUS LLP

(57) ABSTRACT

A method for detecting violations, includes: acquiring a plurality of image frames corresponding to a region to be detected; performing scene semantic segmentation on the plurality of image frames to obtain forbidden violation regions in the plurality of image frames; detecting the plurality of image frames by using a rotating target detection network, the rotating target detection network being used for detecting whether an image frame includes a target detection object; determining, in a case where at least one image frame in the plurality of image frames includes the target detection object, that a violation exists in the region to be detected according to the target detection object and a forbidden violation region corresponding to the target detection object.

17 Claims, 11 Drawing Sheets

(51) Int. Cl.
  *G06V 10/26*   (2022.01)
  *G06V 20/52*   (2022.01)

(58) Field of Classification Search
  CPC .. G06T 7/00; G06T 7/33; G06T 7/246; G06T
                  2207/30232
  See application file for complete search history.

(56)      References Cited

FOREIGN PATENT DOCUMENTS

| | | | | | |
|---|---|---|---|---|---|
| CN | 111091098 | A | | 5/2020 | |
| CN | 111524095 | A | | 8/2020 | |
| CN | 111666945 | A | | 9/2020 | |
| CN | 111814827 | A | | 10/2020 | |
| CN | 111815570 | A | * | 10/2020 | .......... G06T 7/0002 |
| CN | 113096394 | A | * | 7/2021 | .......... G08G 1/0175 |
| CN | 113283273 | A | * | 8/2021 | ............ G06F 18/24 |
| CN | 113591679 | A | | 11/2021 | |
| CN | 114067248 | | * | 2/2022 | |
| WO | WO-2022222445 | A1 | * | 10/2022 | ............. G06N 3/045 |

OTHER PUBLICATIONS

Liu Luocheng et al., Illegal Billboard Detection Based on Object Detection and Semantic Segmentation, Jul. 7, 2021, pp. 127-132, vol. 12, Modern Computer, Guangzhou City, China. Accessible at DOI: 10.3969/j.issn.1007-1423.2021.12.025 (Year: 2021).*

Liu Luocheng et al., Illegal Billboard Detection Based on Object Detection and Semantic Segmentation, Jul. 7, 2021, pp. 127-132, vol. 12, Modern Computer, Guangzhou City, China. Accessible at DOI: 10.3969/j.issn.1007-1423.2021.12.025.

\* cited by examiner

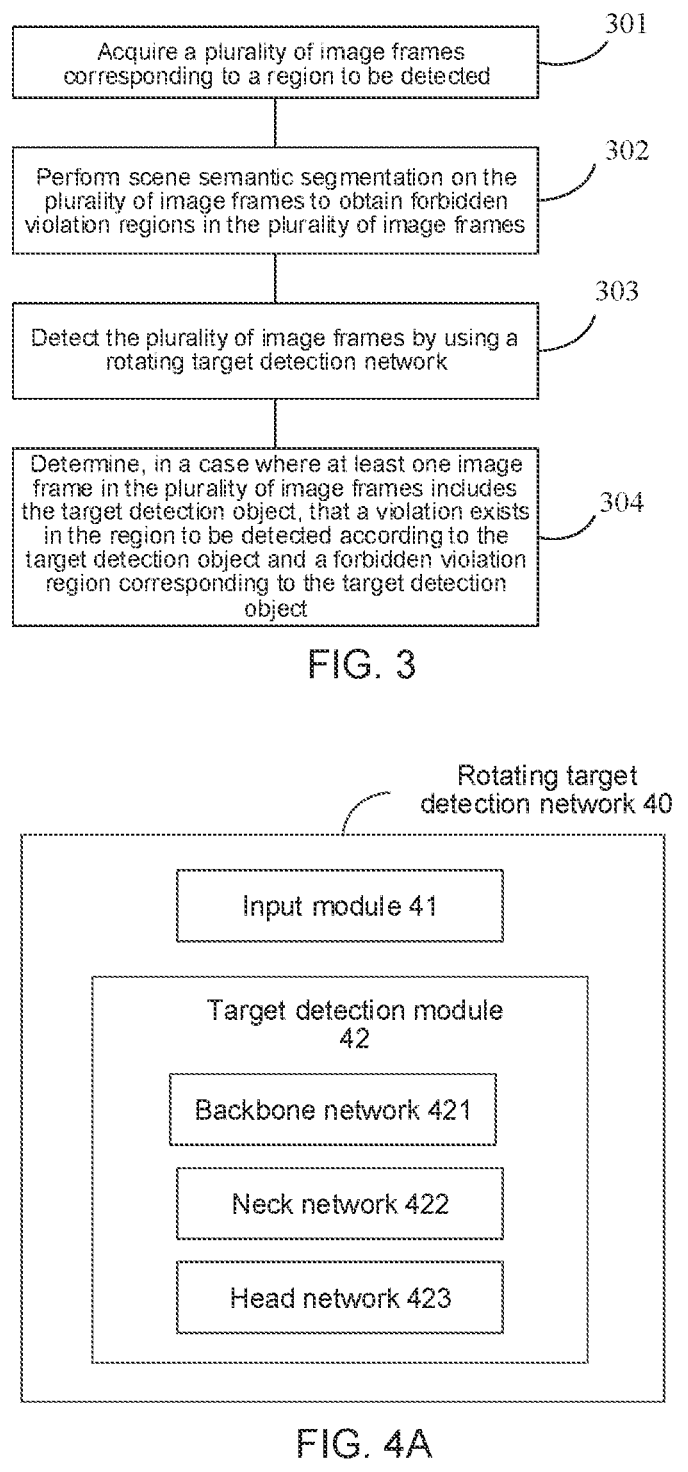

Acquire a plurality of image frames corresponding to a region to be detected — 301

Perform scene semantic segmentation on the plurality of image frames to obtain forbidden violation regions in the plurality of image frames — 302

Detect the plurality of image frames by using a rotating target detection network — 303

Determine, in a case where at least one image frame in the plurality of image frames includes the target detection object, that a violation exists in the region to be detected according to the target detection object and a forbidden violation region corresponding to the target detection object — 304

FIG. 3

Rotating target detection network 40

Input module 41

Target detection module 42

Backbone network 421

Neck network 422

Head network 423

FIG. 4A

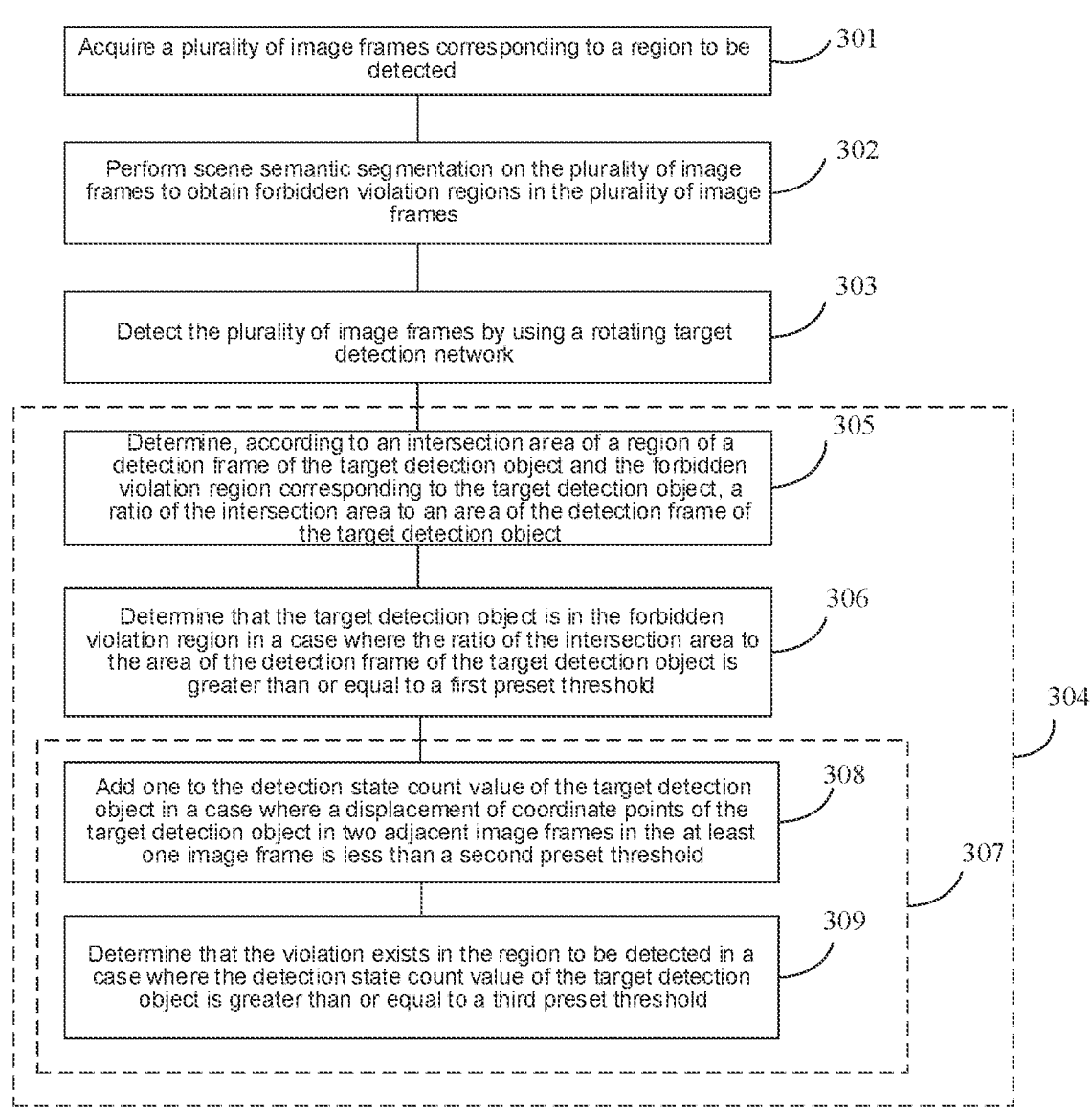

Acquire a plurality of image frames corresponding to a region to be detected — 301

Perform scene semantic segmentation on the plurality of image frames to obtain forbidden violation regions in the plurality of image frames — 302

Detect the plurality of image frames by using a rotating target detection network — 303

Determine, according to an intersection area of a region of a detection frame of the target detection object and the forbidden violation region corresponding to the target detection object, a ratio of the intersection area to an area of the detection frame of the target detection object — 305

Determine that the target detection object is in the forbidden violation region in a case where the ratio of the intersection area to the area of the detection frame of the target detection object is greater than or equal to a first preset threshold — 306

Add one to the detection state count value of the target detection object in a case where a displacement of coordinate points of the target detection object in two adjacent image frames in the at least one image frame is less than a second preset threshold — 308

Determine that the violation exists in the region to be detected in a case where the detection state count value of the target detection object is greater than or equal to a third preset threshold — 309

METHOD AND DEVICE FOR DETECTING VIOLATIONS

CROSS-REFERENCE TO RELATED APPLICATION

This application is a national phase entry under 35 USC 371 of International Patent Application No. PCT/CN2022/083516 filed on Mar. 28, 2022, which is incorporated herein by reference in its entirety.

TECHNICAL FIELD

The present disclosure relates to the field of intelligent detection technologies, and in particular, to a method for detecting violations and a device for detecting violations.

BACKGROUND

In order to ensure that the environment to be detected (e.g., residential area, park, office building, mall, etc.) is clean and tidy, violations in the environment to be detected may generally be detected. For example, violations such as illegal posting of advertisements and illegal drying of clothes in the environment to be detected may be detected.

SUMMARY

In one aspect, a method for detecting violations is provided, and the method includes: firstly, acquiring a plurality of image frames corresponding to a region to be detected; then, performing scene semantic segmentation on the plurality of image frames to obtain forbidden violation regions in the plurality of image frames; detecting the plurality of image frames by using a rotating target detection network, the rotating target detection network being used for detecting whether an image frame includes a target detection object; and finally, determining, in a case where at least one image frame in the plurality of image frames includes the target detection object, that a violation exists in the region to be detected according to the target detection object and a forbidden violation region corresponding to the target detection object.

In some embodiments, the target detection object includes at least one of an advertisement, clothing, or a pedestrian.

In some embodiments, determining that the violation exists in the region to be detected according to the target detection object and the forbidden violation region corresponding to the target detection object includes: determining, according to an intersection area of a region of a detection frame of the target detection object and the forbidden violation region corresponding to the target detection object, a ratio of the intersection area to an area of the detection frame of the target detection object; determining that the target detection object is in the forbidden violation region in a case where the ratio of the intersection area to the area of the detection frame of the target detection object is greater than or equal to a first preset threshold; and determining that the violation exists in the region to be detected according to a detection state count value of the target detection object.

For example, in a case where the target detection object includes an advertisement, determining that the violation exists in the region to be detected according to the detection state count value of the target detection object includes: adding one to the detection state count value of the target detection object in a case where a displacement of coordinate points of the target detection object in two adjacent image frames in the at least one image frame is less than a second preset threshold; and determining that the violation exists in the region to be detected in a case where the detection state count value of the target detection object is greater than or equal to a third preset threshold.

For example, in a case where a target detection object includes clothing and a pedestrian, determining that the violation exists in the region to be detected according to the detection state count value of the target detection object includes: adding one to a detection state count value of the clothing in a case where a center point of a detection frame of the clothing is outside a region of a detection frame of at least one pedestrian; and determining that the violation exists in the region to be detected in a case where the detection state count value of the clothing is greater than or equal to a fourth preset threshold.

In some embodiments, an area of the detection frame of the at least one pedestrian is greater than or equal to a fifth preset threshold, and a center point of the detection frame of the at least one pedestrian is in the forbidden violation region corresponding to the target detection object.

In some embodiments, the method for detecting violations further includes: deleting detection frames with areas less than the fifth preset threshold or center points outside the forbidden violation region in detection frames of pedestrians.

In some embodiments, the rotating target detection network includes a Backbone network, a Neck network and a Head network, and an output of the Head network includes a predicted rotation angle of a detection frame.

In some embodiments, detecting the plurality of image frames by using the rotating target detection network includes: preprocessing the plurality of image frames, and extracting feature data of the plurality of image frames through the Backbone network and the Neck network; and inputting the feature data of the plurality of image frames into the Head network to obtain a detection result of the target detection object. The detection result of the target detection object includes at least one of the detection frame of the target detection object, region coordinates of the detection frame, the predicted rotation angle of the detection frame, or a category of the target detection object.

In some embodiments, the method for detecting violations further includes: reporting alarm information and changing an alarm identifier in a case where the alarm identifier indicates that no alarm has occurred; and reporting the alarm information in a case where the alarm identifier indicates that the alarm has occurred and a time from a last alarm is greater than a preset time.

In another aspect, a device for detecting violations is provided, and the device includes: a processor and a transceiver. The transceiver is configured to acquire a plurality of image frames corresponding to a region to be detected. the processor is configured to: perform scene semantic segmentation on the plurality of image frames to obtain forbidden violation regions in the plurality of image frames; detect the plurality of image frames by using a rotating target detection network, the rotating target detection network is used for detecting whether an image frame includes a target detection object; and determine, in a case where at least one image frame in the plurality of image frames includes a target detection object, that a violation exists in the region to be detected according to the target detection object and a forbidden violation region corresponding to the target detection object.

In some embodiments, the target detection object includes at least one of an advertisement, clothing, or a pedestrian.

In some embodiments, the processor is configured to: determine, according to an intersection area of a region of a detection frame of the target detection object and the forbidden violation region, a ratio of the intersection area to an area of the detection frame of the target detection object; determine that the target detection object is in the forbidden violation region in a case where the ratio of the intersection area to the area of the detection frame of the target detection object is greater than or equal to a first preset threshold; and determine that the violation exists in the region to be detected according to a detection state count value of the target detection object.

In some embodiments, the processor is configured to: add one to the detection state count value of the target detection object in a case where a displacement of coordinate points of the target detection object in two adjacent image frames in the at least one image frame is less than a second preset threshold; and determine that the violation exists in the region to be detected in a case where the detection state count value of the target detection object is greater than or equal to a third preset threshold.

In some embodiments, the processor is configured to: add one to a detection state count value of the clothing in a case where a center point of a detection frame of the clothing is outside a region of a detection frame of at least one pedestrian; and determine that the violation exists in the region to be detected in a case where the detection state count value of the clothing is greater than or equal to a fourth preset threshold.

In some embodiments, an area of the detection frame of the at least one pedestrian is greater than or equal to a fifth preset threshold, and a center point of the detection frame of the at least one pedestrian is in the forbidden violation region corresponding to the target detection object.

In some embodiments, the processor is further configured to delete detection frames with areas less than the fifth preset threshold or center points outside the forbidden violation region in detection frames of pedestrians.

In some embodiments, the rotating target detection network includes a Backbone network, a Neck network and a Head network; and an output of the Head network includes a predicted rotation angle of a detection frame.

In some embodiments, the processor is configured to: preprocess the plurality of image frames, and extract feature data of the plurality of image frames through the Backbone network and the Neck network; input the feature data of the plurality of image frames into the Head network to obtain a detection result of the target detection object. The detection result of the target detection object includes at least one of the detection frame of the target detection object, region coordinates of the detection frame, the predicted rotation angle of the detection frame, or a category of the target detection object.

In some embodiments, the transceiver is further configured to: report alarm information and change an alarm identifier in a case where the alarm identifier indicates that no alarm has occurred; and report the alarm information in a case where the alarm identifier indicates that the alarm has occurred and a time from a last alarm is greater than a preset time.

In yet another aspect, a non-transitory computer-readable storage medium is provided. The computer-readable storage medium stores computer program instructions that, when executed by a detection device, implement the method for detecting violations as described in any of the above embodiments.

In yet another aspect, a computer program product stored on a non-transitory computer-readable storage medium is provided, the computer program product includes computer program instructions for causing a computer to perform the method for detecting violations as described in any of the above embodiments.

In yet another aspect, a computer program is provided. The computer program, when executed on a computer, causes the computer to perform the method for detecting violations as described in any of the above embodiments.

BRIEF DESCRIPTION OF THE DRAWINGS

In order to describe technical solutions in the present disclosure more clearly, the accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings in the following description may be regarded as schematic diagrams, but are not limitations on actual sizes of products, actual processes of methods and actual timings of signals involved in the embodiments of the present disclosure.

FIG. 3 is a flowchart of a method for detecting violations, in accordance with some embodiments;

FIG. 4A is an architecture diagram of a rotating target detection network, in accordance with some embodiments;

FIG. 7 is yet another flowchart of a method for detecting violations, in accordance with some embodiments;

DETAILED DESCRIPTION

Figure 1:
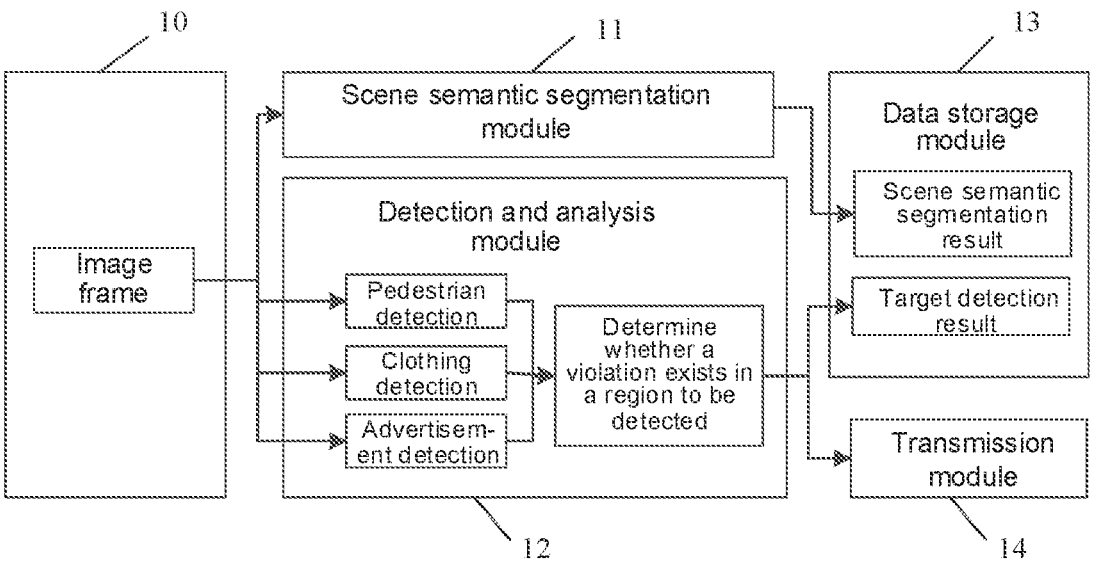
FIG. 1 is a block diagram of a detection system for violations, in accordance with some embodiments.

The technical solutions in some embodiments of the present disclosure will be described clearly and completely with reference to the accompanying drawings. Obviously, the described embodiments are merely some but not all of embodiments of the present disclosure. All other embodiments obtained by a person of ordinary skill in the art based on the embodiments provided in the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Below, the terms such as "first" and "second" are used for descriptive purposes only, but are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a/the plurality of" means two or more unless otherwise specified.

In order to ensure that the environment to be detected (e.g., residential area, park, office building, mall, etc.) is clean and tidy, violations in the environment to be detected may generally be detected. The violations include, but are not limited to, posting advertisements, drying clothing, and other behaviors in a forbidden region (also called a forbidden violation region) of the environment to be detected.

Generally, there are two ways to detect the violations, one is to detect the violations in the environment to be detected through manual inspection. However, the cost of the detection way of the manual inspection is high, and the management efficiency is low. The other way is to detect the violations in the environment to be detected through a monitoring apparatus. However, since some violations are random, in a case where the monitoring apparatus is used for detecting the violations in the environment to be detected, a large amount of noise is introduced, and the violations cannot be accurately detected. For example, advertisements posted illegally are often tilted due to randomness in manual pasting, and if a horizontal bounding frame is used for a target detection, a large amount of background noise will be introduced, and it will be difficult to accurately detect tilted advertisements. For another example, in windy conditions, clothing dried in the forbidden region swing with the wind, and if a horizontal bounding frame is used for target detection, a large amount of background noise will be introduced, and it will be difficult to accurately detect tilted clothing.

In addition, when the monitoring apparatus is used to detect the violations, the forbidden region is generally manually defined in advance in a region shot by the monitoring apparatus. When a shooting angle of the monitoring apparatus changes, the forbidden region needs to be manually re-calibrated, and then the violations in the forbidden region are detected, so that the flexibility is poor.

Therefore, some embodiments of the present disclosure provide a method for detecting violations. By constructing a rotating target detection network, the violations in a region to be detected can be accurately detect, management efficiency can be improved, and the cost for detecting the violations can be reduced. When the shooting angle of the monitoring apparatus changes, scene semantic segmentation can be performed on an image shot by the monitoring apparatus again to obtain corresponding forbidden region(s); therefore, there is no need to manually calibrate the forbidden region again, and the detection flexibility can be improved.

The method for detecting the violations provided in the embodiments of the present disclosure may be applied to a detection system. As shown in FIG. 1, the detection system includes a data acquisition module 10, a scene semantic segmentation module 11, a detection and analysis module 12, a data storage module 13, and a transmission module 14.

The data acquisition module 10 is used to acquire an image frame and send the image frame to the scene semantic segmentation module 11 and the detection and analysis module 12. The data acquisition module 10 may extract the image frame according to video stream shot by the monitoring apparatus (e.g., a camera) in the region to be detected and the camera information. The region to be detected may be a region shot by at least one monitoring apparatus in an environment to be detected.

The scene semantic segmentation module 11 is used to perform scene semantic segmentation on the image frame acquired by the data acquisition module 10 to obtain a scene semantic segmentation result, and store the scene semantic segmentation result in the data storage module 13. For example, the scene semantic segmentation module 11 may segment the countless background categories such as grass, road, sky, water surface, and wall surface in the image frame, so as to obtain the scene semantic segmentation result.

In some embodiments, after the angle of the camera is fixed, the scene semantic segmentation module 11 may perform scene semantic segmentation on the region to be detected shot by the camera once, and the scene semantic segmentation result may be stored in the data storage module 13. It can be understood that, when the angle of the camera does not change, the scene semantic segmentation results of a plurality of frames of images acquired by the data acquisition module 10 are the same. Therefore, when the angle of the camera does not change, there may be no need to perform the scene semantic segmentation again on each frame of image, and the scene semantic segmentation result stored in the data storage module 13 is directly used to further determine whether the violation exists in the region to be detected.

In some embodiments, when the shooting angle of the camera changes, the detection system may perform the scene semantic segmentation on a new scene shot by the camera again, and store the re-segmented scene semantic segmentation result in the data storage module 13. It can be understood that, when the shooting angle of the camera changes, compared with the manual re-calibration for the forbidden region, the detection system provided in the embodiments of the present disclosure may perform the scene semantic segmentation again on the image shot by the camera through the scene semantic segmentation module 11, so as to obtain the corresponding forbidden region(s). Thus, there is no need to manually calibrate the forbidden region again, and the detection flexibility can be improved.

In some embodiments, other module(s) (e.g., the detection and analysis module 12) in the detection system may define the forbidden region(s) according to the scene semantic segmentation result. The forbidden regions defined by different violations may be partially the same, or may be all the same, or may be all different. For example, the detection and analysis module 12 may define part or all of the scene semantic segmentation result obtained by the scene semantic segmentation module 11 as forbidden regions. In an example where the scene semantic segmentation result obtained by the scene semantic segmentation module 11 include grass, road, sky, water surface and wall surface, the wall surface, the grass and the road may be defined as the forbidden regions.

The detection and analysis module 12 is used to detect and track a target detection object in the image frame, and determine, in a case where the image frame includes the target detection object, whether the violation exists in the region to be detected according to the scene semantic segmentation result. The target detection object includes, but is not limited to, at least one of detection objects such as pedestrians, clothing, and advertisements. For example, as shown in FIG. 1, in a case where the detection system is used to detect advertisements posted illegally and clothing dried illegally, the detection and analysis module 12 is used for performing pedestrian detection, clothing detection and advertisement detection on the image frame sent by the data acquisition module 10.

For example, in a case where the detection and analysis module 12 determines that an image frame acquired by the data acquisition module 10 includes a target detection object, forbidden region(s) may be defined according to the scene semantic segmentation result stored in the data storage module 13, and it is determined whether the violation exists in the region to be detected according to a detection frame of the target detection object and a forbidden region corresponding to the target detection object.

In some embodiments, the detection and analysis module 12 may detect the target detection object in the image frame by the rotating target detection network, so as to obtain a detection frame that better matches the target detection object, thereby reducing redundant information in network learning and policy making. The target detection object can be accurately detected in a case where the target detection object in the image frame is in a tilted state.

In some embodiments, the detection and analysis module 12 is further used to store a detection result of the target detection object in the data storage module 13.

The data storage module 13 is used to store the scene semantic segmentation result obtained by the scene semantic segmentation module 11 and the detection result of the target detection object detected by the detection and analysis module 12.

The transmission module 14 is used to send alarm information or prompt information to a property management center when the detecting and analyzing module 12 determines that the violation exists in the region to be detected.

Figure 2:
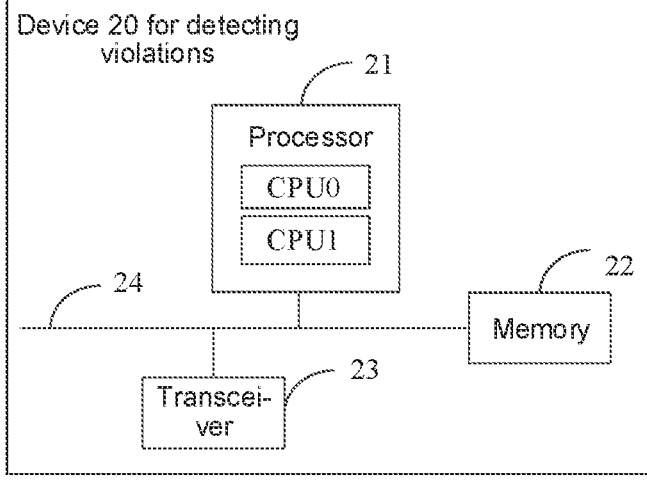
FIG. 2 is a hardware device diagram of a detection system for violations, in accordance with some embodiments.

The method for detecting the violations provided in some embodiments of the disclosure may be applied to a device for detecting violations. FIG. 2 is a hardware device diagram of a detection system for violations, in accordance with some embodiments of the disclosure. As shown in FIG. 2, the device 20 for detecting violations includes at least one processor 21, a memory 22, a transceiver 23, and a communication bus 24.

Components of the device 20 for detecting violations are described in detail below with reference to FIG. 2.

For example, the processor 21 is a control center of the device 20 for detecting violations, and it may be a single processor, or a general term of a plurality of processing elements. For example, the processor 21 is a central processing unit (CPU), and may be an application specific integrated circuit (ASIC), or one or more integrated circuits configured to implement the embodiments of the present disclosure, such as one or more microprocessors (digital signal processor, DSPs), or one or more field programmable gate arrays (FPGAs).

The processor 21 may perform various functions of the device 20 for detecting violations by running or executing software programs stored in the memory 22, and calling the data stored in the memory 22.

For example, the processor 21 may include one or more CPUs, such as CPU0 and CPU1 shown in FIG. 2.

The memory 22 may be, but is not limited to, a read-only memory (ROM) or a static storage communication device of any other type that can store static information and instructions, a random access memory (RAM) or a dynamic storage communication device of any other type that can store information and instructions, or an electrically erasable programmable read-only memory (EEPROM), a compact disc read-only memory (CD-ROM) or any other disc storage, a compact disc storage (including a compact disc, a laser disc, an optical disc, a digital general-purpose disc, and a Blu-ray disc), a magnetic disk storage medium or any other magnetic disk storage communication device, or any other medium that can be used to carry or store desired program codes with instructions or data and can be accessed by a computer. The memory 22 may exist independently and be connected to the processor 21 through the communication bus 24. The memory 22 may also be integrated with the processor 21.

The memory 22 is used to store software programs for execution of the solutions of the present disclosure, and the execution is controlled by the processor 21.

The transceiver 23 is used for communicating with other communication devices. Of course, the transceiver 23 may also be used for communicating with a communication network, such as Ethernet, a radio access network (RAN), a wireless local area network (WLAN), or the like. The transceiver 23 may include a receiving unit for implementing a receiving function and a transmitting unit for implementing a transmitting function.

The communication bus 24 may be an industry standard architecture (ISA) bus, a peripheral component interconnect (PCI) bus, or an extended industry standard architecture (EISA) bus. The bus may be divided into an address bus, a data bus, a control bus, etc. For ease of illustration, only one thick line is used to represent the bus in FIG. 2, but it does not mean that there is only one bus or one type of bus.

The structure of the device 20 for detecting violations shown in FIG. 2 does not constitute a limitation on the device 20 for detecting violations, and the device 20 for detecting violations may include more or less components than those shown in the figure, or combine some components, or arrange different components.

Some embodiments of the present disclosure provide a method for detecting violations. As shown in FIG. 3, the method includes steps 301 to 304.

In step 301, a plurality of image frames corresponding to a region to be detected are acquired.

The region to be detected is a region shot by a monitoring apparatus (e.g., a camera) in an environment to be detected. The environment to be detected includes, but is not limited to, residential area, park, office building, mall, etc. The environment to be detected may include one or more regions to be detected, and each region to be detected is a region shot by a monitoring apparatus in the environment to be detected.

In some embodiments, acquiring the plurality of image frames corresponding to the region to be detected includes: extracting the plurality of image frames according to the video stream of the region to be detected shot by the camera and the camera information.

In some embodiments, the plurality of image frames may be shot by the same camera at the same angle, or shot by the same camera at different angles, which is not limited in the present disclosure. The camera may be any camera in the environment to be detected.

In some embodiments, step 301 described above may be performed by the data acquisition module 10 in the detection system shown in FIG. 1.

In step 302, scene semantic segmentation is performed on the plurality of image frames to obtain forbidden violation regions in the plurality of image frames.

In some embodiments, a semantic segmentation model may be used to perform the scene semantic segmentation on the image frame, so as to obtain a scene semantic segmentation result. The semantic segmentation model may use SwinTransformer as a backbone network and UperNet as an overall network frame.

In an example where the environment to be detected is a park, the scene semantic segmentation model of UperNet+ SwinTransformer may be used to segment the countless background categories such as grass, road, sky, water surface, and wall surface in an image frame shot by a camera in the park, so as to obtain a scene semantic segmentation result.

In some embodiments, in order to improve scene semantic segmentation accuracy, a test-time augmentation (TTA) technique is used to perform horizontal inversion and random rotation transformation on the image frame acquired by the data acquisition module 10 during model inference, and segment the original image and the transformed image frames. Then, inverse transformation is performed on the augmented images, the prediction probability values of all images predicted by the model are averaged, and a final scene semantic segmentation result is obtained.

The forbidden violation region (also called as the forbidden region) is a region where violations are forbidden in the environment to be detected or the region to be detected. The forbidden violation regions include, but are not limited to, wall, lawn, road, public seat, etc. A type of the forbidden violation region is not limited in the present disclosure, and the forbidden violation region is related to the environment to be detected and the violation to be detected. In a case where the environments to be detected are different and the violations to be detected are different, the forbidden violation regions may be different.

In some embodiments, the forbidden violation regions corresponding to different violations may be partially the same, may be all the same, or may be all different.

In some embodiments, the user may set a preset forbidden region list in advance. For example, the property manager may set a preset forbidden region list including wall, lawn, and road in advance.

In some embodiments, step 302 includes: performing the scene semantic segmentation on the plurality of image frames, and obtaining the forbidden violation regions in the plurality of image frames according to the scene semantic segmentation results and the preset forbidden region list. For example, if a scene semantic segmentation result is in the preset forbidden region list, a forbidden violation region in the image frame may be obtained.

In some embodiments, if the plurality of image frames are shot by the same camera at the same angle, the scene semantic segmentation results of the plurality of image frames are the same. Therefore, the scene semantic segmentation may be performed on one image frame in the plurality of image frames, and the segmentation result is stored in the data storage module.

In some embodiments, if the plurality of image frames are shot by the same camera at different angles, the scene semantic segmentation results of the plurality of image frames may be different, and scene semantic segmentation results of multiple image frames shot at the same angle are the same. Therefore, the scene semantic segmentation may be performed on one image frame in at least one image frame shot at the same angle once.

In some embodiments, step 302 described above may be performed by the scene semantic segmentation module 11 in the detection system shown in FIG. 1.

In step 303, the plurality of image frames are detected by using a rotating target detection network.

The rotating target detection network is used for detecting whether the image frame includes a target detection object.

For example, step 303 may include: detecting the plurality of image frames by using the rotating target detection network, and determining whether the target detection object is included in the plurality of image frames. The target detection object includes at least one of detection objects such as pedestrians, clothing, and advertisements. The specific type(s) of the target detection object(s) and the number of the target detection object(s) are not limited in the present disclosure, and the type of the target detection object is related to the specific violation to be detected.

In some embodiments, the rotating target detection network may be constructed based on yolov5, which can detect tilted target detection objects in the image frames. The rotating target detection network adds a rotation angle prediction output of the detection frame (which may also be referred to as a bounding frame).

FIG. 4A is an architecture diagram of a rotating target detection network 40, in accordance with some embodiments. As shown in FIG. 4A, the rotating target detection network 40 includes an input module 41 and a target detection module 42. The input module 41 is used to input image data of the plurality of image frames into the target detection module 42. Data transmission can be performed between the input module 41 and the target detection module 42.

The target detection module 42 is used to process the image data of the plurality of image frames to obtain a detection result of a target detection object. As shown in FIG. 4A, the target detection module 42 includes a Backbone network 421, a Neck network 422 and a Head network 423. An output of the Head network 423 includes the predicted rotation angle of the detection frame.

The Backbone network 421 is used to perform an extraction operation on the image data of the plurality of image frames to obtain general image features, and transmit the general image features to the Neck network 422. Accordingly, the Neck network 422 receives the generic image features sent by the Backbone network 421. It can be understood that, in the field of image detection, the generic image feature is an image feature of an object of a common category obtained by the Backbone network 421 after extracting original image data during preliminary image extraction, which is a well-known concept in the art.

The Neck network 422 is used to extract image features that are strongly correlated with the category of the target detection object from the general image features, and send the strongly correlated image features to the Head network

423. Accordingly, the Head network 423 receives the strongly correlated image features sent by the Neck network 422. It can be understood that, the strongly correlated image features are image features of an object that is similar to the category of the target detection object obtained by the Neck network 422 after performing an extraction operation on the general image features. The category of the target detection object may be a detection category set by the rotating target detection network 40.

It should be noted that, the present disclosure is not limited to the specific implementation of obtaining the general image features by the Backbone network 421, and the specific implementation of obtaining the image features strongly related to the category of the target detection object by the Neck network 422.

The Head network 423 is used to calculate the detection result of the target detection object according to the strongly related image features. The detection result of the target detection object includes, but is not limited to, at least one of the detection frame of the target detection object, the predicted rotation angle of the detection frame, region coordinates of the detection frame, or the category of the target detection object.

Figure 4B:
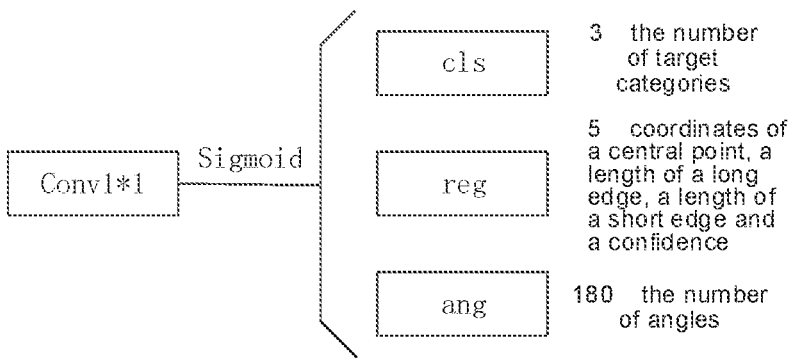
FIG. 4B is a schematic diagram of a Head network in a rotating target detection network, in accordance with some embodiments.

In an example where target detection objects include a pedestrian, clothing and an advertisement, output parameters of the Head network 423 shown in FIG. 4B include three parameters of cls, reg, and ang. cls is the number of categories of the target detection objects, and the value of cls is 3. reg is the region coordinates of the detection frame. reg includes 5 parameters, which are a horizontal coordinate and a vertical coordinate of a center point of the detection frame, a length of a long edge of the detection frame, a length of a short edge of the detection frame and a confidence. Since the confidence is a parameter corresponding to the scene semantic segmentation and is used for distinguishing whether the target detection object is a foreground or a background, the confidence does not participate in actual calculation. Therefore, in the actual calculation, reg can be represented by (x_c, y_c, long, short), where x_c is the horizontal coordinate of the center point of the detection frame, y_c is the vertical coordinate of the center point of the detection frame, long is the length of the long edge of the detection frame, and short is the length of the short edge of the detection frame. ang is the number of angles, the value is 180, which represents 0 to 179 degrees. The classification loss of the cross entropy is adopted as the angle loss function.

As shown in FIG. 4B, in the Head network 423, the number of output channels of convolution 1×1 (Conv 1*1 shown in FIG. 4B) is na*(cls+5+180), where na is the number of anchor frames, and cls is the number of the categories of the target detection objects. 5 is the parameters included in the region coordinates of the reg detection frame. 180 is the number of the angles of ang.

In some embodiments, detecting the plurality of image frames by using the rotating target detection network includes: preprocessing the image frames, and extracting feature data of the image frames through the Backbone network and the Neck network; and inputting the feature data of the image frames into the Head network to obtain the detection result of the target detection object. The detection result of the target detection object includes the detection frame of the target detection object, region coordinates of the detection frame, the predicted rotation angle of the detection frame, and the category of the target detection object.

Figure 5:
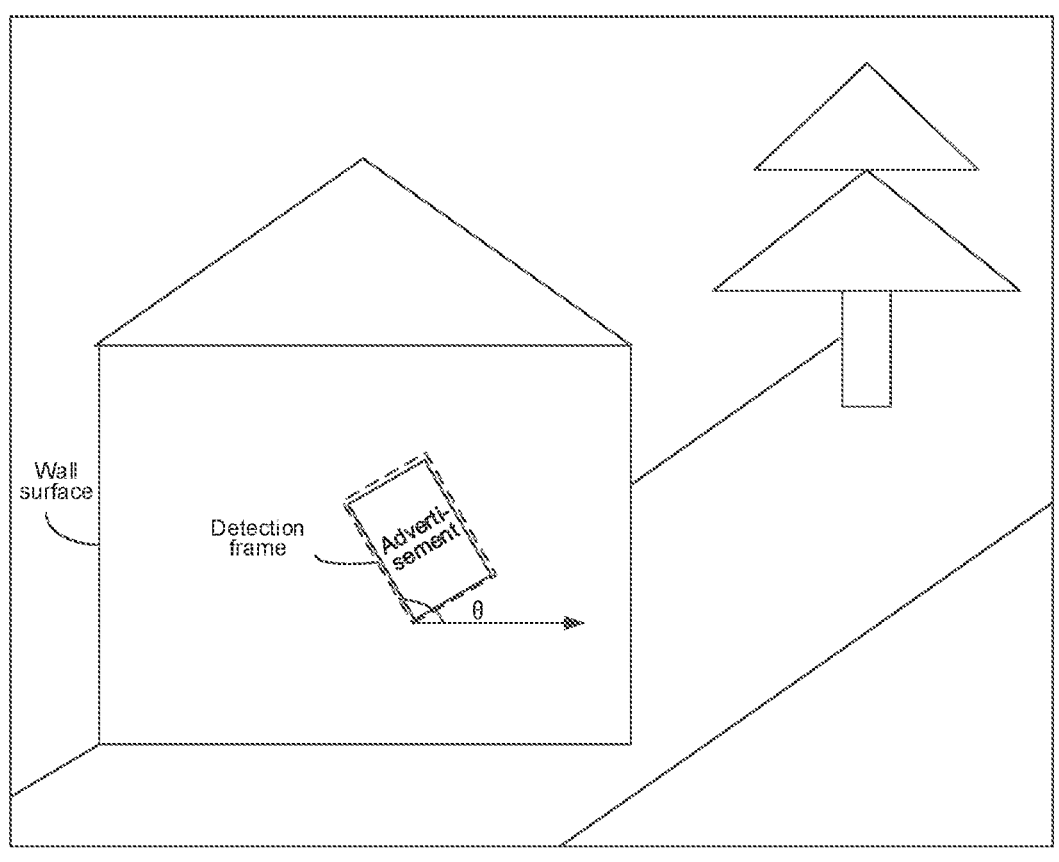
FIG. 5 is a diagram of an application scenario of a rotating target detection network, in accordance with some embodiments.

For example, as shown in FIGS. 4A, 4B and 5, when the image frame shown in FIG. 5 is detected by using the rotating target detection network, first, the image frame shown in FIG. 5 is input to the input module 41 of the rotating target detection network for preprocessing; then, the image features of the image frame are extracted through the Backbone network 421 and the Neck network 422; and after that, the extracted image features are input into the Head network 423 for prediction, so as to obtain the region coordinates of the detection frame, the predicted rotation angle θ of the detection frame, and the category of the target detection object, i.e., advertisement.

For example, when the Head network 423 calculates the detection result of the target detection object according to the image features, the detection frame may be rotated counterclockwise by 0 degree to 179 degrees around the x-axis, and the detection frame, best matches to the target detection object, in 180 rotation states may be obtained by using the angle loss function; and therefore, the rotation angle of the detection frame may be obtained to achieve the detection of the target detection object in the image frame.

In some embodiments, as shown in FIG. 5, the predicted rotation angle θ of the detection frame may be defined by the long edge, the predicted rotation angle θ of the detection frame is an angle between the long edge of the detection frame and the x-axis, and the predicted rotation angle θ of the detection frame may be 0 to 179 degrees.

It can be understood that, compared with the situation that the horizontal bounding frame is used for target detection, a large amount of background noise is introduced, and the inclined target detection object is difficult to accurately detect, in the present disclosure, by constructing the rotated target detection network to detect the target detection object in the image frame, the detection frame better matches to the target detection object can be obtained, thereby reducing redundant information in network learning and policy making, and accurately detecting the inclined target detection object in the image frame.

In some embodiments, step 303 described above may be performed by the detection and analysis module 12 in the detection system shown in FIG. 1.

The performed order of steps 302 and 303 is not limited in the present disclosure. In some embodiments, step 302 may be performed before step 303, may be performed after step 303, or may be performed simultaneously with step 303.

When it is determined that at least one image frame in the plurality of image frames includes the target detection object in step 303, step 304 may be continuously performed to further determine whether the violation exists in the region to be detected. When it is determined that the plurality of image frames do not include the target detection object in step 303, it indicates that there is no violation in the region to be detected.

In step 304, in the case where the at least one image frame in the plurality of image frames includes the target detection object, it is determined that the violation exists in the region to be detected according to the target detection object and the forbidden violation region corresponding to the target detection object.

In some embodiments, the violations in the region to be detected may be one or more. The violations include, but are not limited to, illegal posting of advertisements and illegal drying of clothing. The target detection objects corresponding to different violations may be the same or different, and one violation may correspond to one or more target detection objects.

In some embodiments, since the forbidden regions for different violations may be the same or different, the forbidden regions corresponding to different target detection objects may be partially the same, all the same or all different. The embodiments of the disclosure are illustratively described by taking an example in which the forbidden violation regions corresponding to illegal posting of advertisements and illegal drying of clothing are partially the same. The forbidden violation region corresponding to each target detection object may be one type of region or multiple types of regions.

For example, in a case where the target detection object is the advertisement, the forbidden violation regions corresponding to the target detection object includes wall surface and road. For another example, in a case where the target detection object is clothing, or the target detection objects are the clothing and pedestrian, the forbidden violation regions corresponding to the target detection objects include road and lawn.

In some embodiments, if at least one image frame includes at least one target detection object, it may be further determined that the violation exists in the region to be detected according to the target detection object and forbidden violation region(s) corresponding to the target detection object.

For example, if at least one image frame includes an advertisement, it is determined whether illegal posting of advertisement exists in the region to be detected according to the advertisement and the forbidden violation region(s) corresponding to the advertisement. For another example, if at least one image frame includes a pedestrian and clothing, it is determined whether illegal drying of the clothing exists in the region to be detected according to the clothing and the forbidden violation region(s) corresponding to the clothing dried illegally. For yet another example, if at least one image frame includes an advertisement, a pedestrian and clothing, it is determined whether illegal posting of the advertisement exists in the region to be detected according to the advertisement and the forbidden violation region(s) corresponding to the advertisement; in addition, it is determined whether illegal drying of the clothing exists in the region to be detected according to the clothing and the forbidden violation region(s) corresponding to the clothing dried illegally.

In some embodiments, step 304 described above may be performed by the detection and analysis module 12 in the detection system shown in FIG. 1.

For example, in a case where at least one image frame in the plurality of image frames includes a target detection object, the detection and analysis module 12 may determine whether the violation exists in the region to be detected according to a region of a detection frame of the target detection object and a forbidden violation region corresponding to the target detection object.

Figure 6:
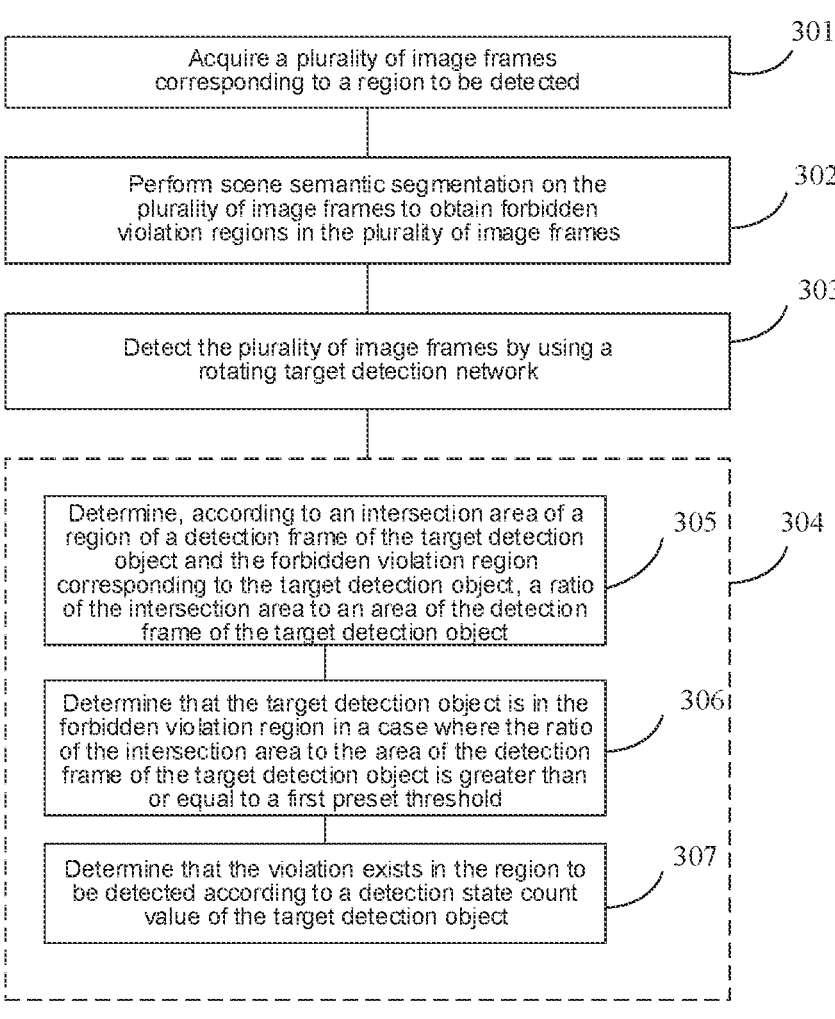
FIG. 6 is another flowchart of a method for detecting violations, in accordance with some embodiments.

In some embodiments, as shown in FIG. 6, step 304 may include steps 305 to 307.

In step 305, it is determined, according to an intersection area of the region of the detection frame of the target detection object and the forbidden violation region corresponding to the target detection object, a ratio of the intersection area to an area of the detection frame of the target detection object.

For example, in the case where the at least one image frame includes the target detection object, it may be determined whether the target detection object is in the forbidden violation region according to the intersection area of the region of the detection frame of the target detection object and the forbidden violation region.

In step 306, it is determined that the target detection object is in the forbidden violation region in a case where the ratio of the intersection area to the area of the detection frame of the target detection object is greater than or equal to a first preset threshold.

In some embodiments, if the ratio of the intersection area of the region of the detection frame of the target detection object and the forbidden violation region to the area of the detection frame of the target detection object is large (e.g., greater than or equal to the first preset threshold), it can be determined that the target detection object is in the forbidden violation region. If the ratio of the intersection area of the region of the detection frame of the target detection object and the forbidden violation region to the area of the detection frame of the target detection object is small (e.g., less than the first preset threshold), it can be determined that the target detection object is not in the forbidden violation region.

For example, the first preset threshold may be a preset value greater than 0 and less than or equal to 1. In an example where the first preset threshold is 0.8, in a case where the ratio of the intersection area corresponding to the target detection object to the area of the detection frame of the target detection object is greater than 0.8, 80% of the detection frame of the target detection object is in the forbidden violation region, and it is determined that the target detection object is in the forbidden violation region. The specific value of the first preset threshold is not limited in the embodiments of the present disclosure, and the first preset threshold is taken as 0.8 for illustration here.

In some embodiments, in order to ensure that the detection of the violations is more accurate, it may be further determined, according to a detection state count value of the target detection object in multiple image frames, whether the violation exists in the region to be detected in a case where it is determined that the target detection object is in the forbidden violation region.

In 307, it is determined that the violation exists in the region to be detected according to the detection state count value of the target detection object.

An image frame may include one or more target detection objects, and types of the one or more target detection objects may be the same, may be different, or may be partially the same. Each target detection object corresponds to one detection state count value.

In some embodiments, an initial value of the detection state count value of the target detection object may be a preset value. The specific value of the initial value of the detection state count value of the target detection object is not limited in the present disclosure, and the following embodiments are illustratively described by taking an example where the initial value of the detection state count value of the target detection object is 0. It should be noted that, in the case where the initial value of the detection state count value of the target detection object is 0, every time it is determined that there is a violation of the target detection object once, and the detection state count value of the target detection object is added by one.

The detection state count value of the target detection object is used for representing the number of violations of the target detection object, and in a case where the number of violations of the target detection object in multiple frames of images reaches a certain value (e.g., is greater than or equal to a third preset threshold), it may be determined that the violation exists in the region to be detected.

In some embodiments, steps 306 and 307 described above may be combined into one step. The step includes: in the case where the ratio of the intersection area to the area of the detection frame of the target detection object is greater than or equal to the first preset threshold, it is determined that the violation exists in the region to be detected according to the detection state count value of the target detection object. In the case where the ratio of the intersection area to the area of the detection frame of the target detection object is relatively large, it indicates that the target detection object is in the forbidden violation region; and therefore, in the case where the ratio of the intersection area to the area of the detection frame of the target detection object is determined to be greater than or equal to the first preset threshold, it may be directly determined whether the violation exists in the region to be detected according to the detection state count value of the target detection object.

In some embodiments, in a case where illegal posting of advertisements is detected (e.g., in a case where the target detection object includes an advertisement), since the posted advertisement is usually a static object in a sticky state, in order to avoid considering garbage, leaves, etc. floating in the air as advertisements posted illegally and improve the accuracy of detecting the advertisement posted illegally, as shown in FIG. 7, step 307 may include steps 308 and 309.

In 308, in a case where a displacement of coordinate points of the target detection object in two adjacent image frames in the at least one image frame is less than a second preset threshold, the detection state count value of the target detection object is added by one.

The coordinate point of the target detection object includes five coordinate points of the advertisement detection frame, which are four points of an upper left, a lower left, an upper right, and a lower right of the advertisement detection frame, and a center point of the advertisement detection frame. The coordinate point displacement of the target detection object refers to a displacement between a coordinate point of the advertisement in a current image frame and a corresponding coordinate point of the advertisement in a previous image frame.

For example, the coordinate point displacement of the target detection object includes a displacement between a center point of a detection frame of an advertisement in a current image frame and a center point of the detection frame of the advertisement in a previous image frame, a displacement between an upper left point of the detection frame of the advertisement in the current image frame and an upper left point of the detection frame of the advertisement in the previous image frame, and a displacement between a lower left point of the detection frame of the advertisement in the current image frame and a lower left point of the detection frame of the advertisement in the previous image frame. By analogy, the coordinate point displacement of the target detection object may include five values.

In some embodiments, adding one to the detection state count value of the target detection object in the case where the displacement of the coordinate points of the target detection object in two adjacent image frames in the at least one image frame is less than the second preset threshold may include: in a case where a displacement of at least one coordinate point in the five coordinate points of the detection frame of the advertisement in the current image frame relative to a corresponding coordinate point of the detection frame of the advertisement in the previous image frame is less than the second preset threshold, it can be determined that there is a violation of the target detection object once, and the detection state count value of the advertisement is add by one.

In some embodiments, the displacement of the coordinate points of the target detection object in two adjacent image frames in the at least one image frame may be calculated according to the detection result of the target detection object obtained in step 303. For example, the coordinate point displacement of the same advertisement in two adjacent image frames may be calculated according to the region coordinates of the advertisement detection frame obtained in step 303.

It can be understood that, in a case where the target detection object is determined to be in the forbidden violation region, the coordinate point displacement of the target detection object in two adjacent image frames in the at least one image frame is calculated, and it is determined that there is a violation of the target detection object once in a case where the displacement is small. Thus, it may be possible to avoid considering the garbage, leaves, etc. floating in the air as advertisements posted illegally and improve the accuracy of detecting the advertisement posted illegally.

In step 309, it is determined that the violation exists in the region to be detected in a case where the detection state count value of the target detection object is greater than or equal to the third preset threshold.

When advertisements posted illegally are detected, posted advertisements may fall due to wind, rain or the like; and therefore, if it is determined that the number of violations of the target detection object in multiple frame images is large (for example, the detection state count value of the target detection object is greater than or equal to the third preset threshold), it is indicated that the target detection object is a firmly pasted advertisement. That is, it is determined that illegal posting of advertisements exist in the region to be detected.

Figure 8:
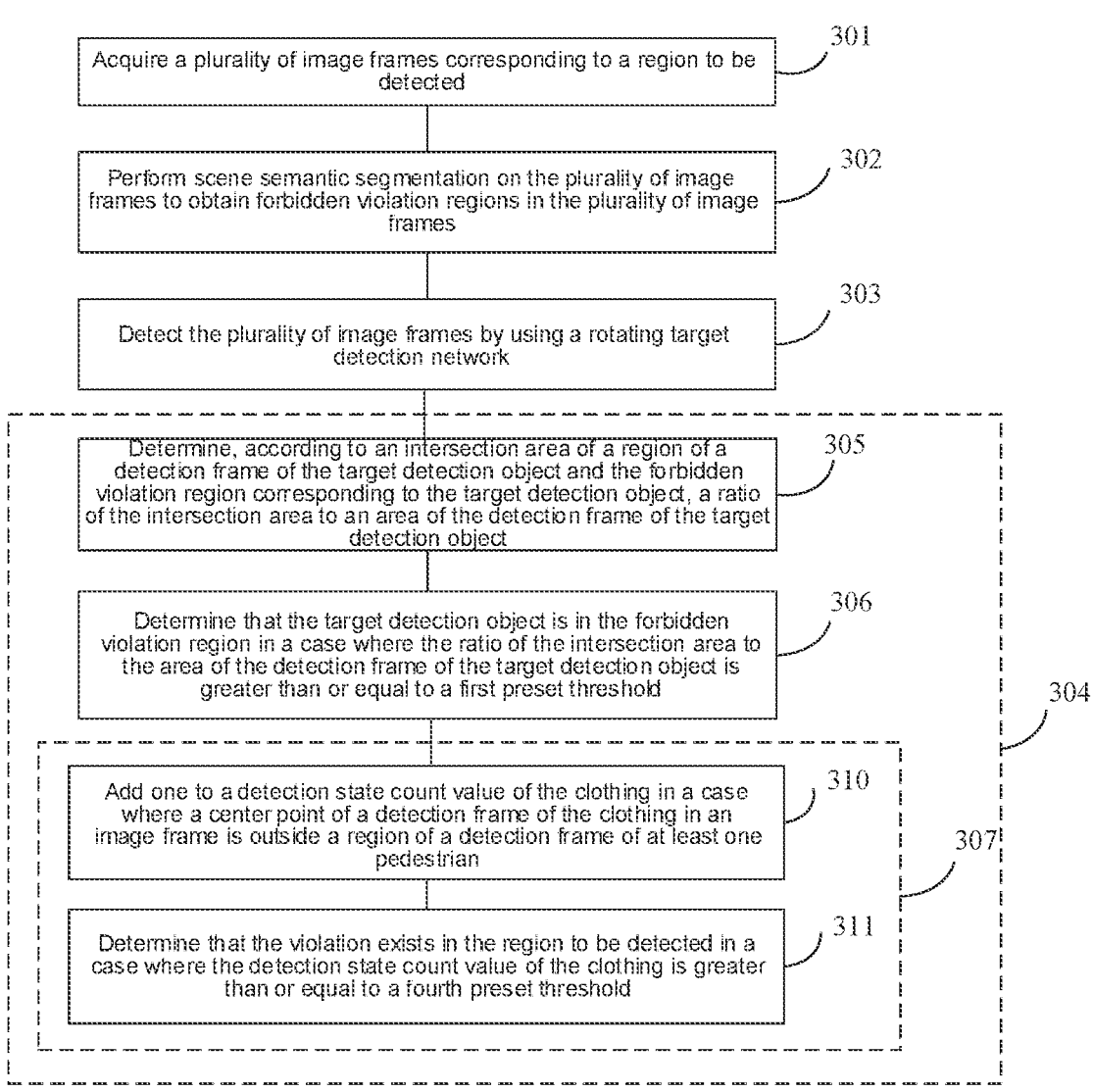
FIG. 8 is yet another flowchart of a method for detecting violations, in accordance with some embodiments.

In some embodiments, when clothing dried illegally is detected (for example, when the target detection objects include clothing and a pedestrian), since clothing worn by the pedestrian may has an influence on the detection of the clothing dried illegally, in order to further improve the accuracy of detecting the clothing dried illegally, as shown in FIG. 8, the above step 307 may include steps 310 and 311.

In 310, in a case where a center point of a detection frame of clothing in an image frame is outside a region of a detection frame of at least one pedestrian, the detection state count value of the clothing is added by one.

In some embodiments, in a case where an initial value of the detection state count value of the clothing is 0, if the center point of the detection frame of the clothing is outside the detection frame region of the at least one pedestrian, it can be determined that the clothing is clothing dried illegally, and is not clothing worn by the pedestrian; it is determined that there is a violation of the target detection object once, and the detection state count value of the clothing is added by one. If the center point of the detection frame of the clothing is in the detection frame region of the at least one pedestrian, it can be determined that the target detection object is the clothing worn by the pedestrian; in this case, the clothing does not belong to violations, and the detection state count value of the clothing is not changed.

In an example where an initial value of a detection state count value of clothing is 0, if a center point of a detection frame of the clothing is outside a detection frame region of at least one pedestrian in a first image frame, the detection state count value of the clothing is added by one. If the center point of the detection frame of the clothing is in the detection frame region of at least one pedestrian in a second image frame, the detection state count value of the clothing is not changed. If the center point of the detection frame of the clothing is outside the detection frame region of at least one pedestrian in a third image frame, the detection state count value of the clothing is added by one again. By analogy, the detection state count value of the clothing in a plurality of image frames can be obtained. The detection state count value of the clothing indicates the number of violations of the clothing.

For example, in ten image frames, in the case where the center point of the detection frame of the clothing is outside the detection frame region of the pedestrian, the clothing is determined as an illegal target detection object, and the detection state count value indicating the number of violations of the clothing is added by one. In the case where the clothing is in the detection frame region of the pedestrian, the clothing is determined as clothing worn by the pedestrian, and the detection state count value of the clothing is not changed. By analogy, if the center point of the detection frame of the clothing in eight image frames in the ten image frames is outside the detection frame region of the pedestrian, the detection state count value of the clothing can be obtained to be eight.

In some embodiments, an area of the detection frame of the at least one pedestrian is greater than or equal to a fifth preset threshold, and a center point of the detection frame of the at least one pedestrian is in the forbidden violation region corresponding to the target detection object. It can be understood that, in order to improve the speed and accuracy of detecting the clothing dried illegally, a detection frame of a pedestrian with a relatively small area in the image frame and a detection frame of a pedestrian with a center point not in the forbidden violation region in the image frame may be deleted, and a detection frame of a pedestrian with a relatively large area in the image frame and a detection frame of a pedestrian with a center point in the forbidden violation region in the image frame (i.e., the detection frame of the at least one pedestrian) may be retained. Then, it is determined whether the center point of the detection frame of the clothing is in the retained detection frame region of at least one pedestrian, and whether the clothing is the clothing worn by the pedestrian or the illegal clothing.

In some embodiments, it may be calculated whether the center point of the detection frame of the clothing in the image frame is outside the detection frame region of the pedestrian according to the detection result of the target detection object obtained in step 303. For example, it may be calculated whether the center point of the clothing detection frame is outside the detection frame region of the pedestrian based on the region coordinates of the clothing detection frame and the region coordinates of the pedestrian detection frame obtained in step 303.

In step 311, it is determined that the violation exists in the region to be detected in a case where the detection state count value of the clothing is greater than or equal to a fourth preset threshold.

When the clothing dried illegally is detected, it is possible that the dried clothing overlap with a pedestrian who pass by. In order to improve the accuracy of detecting the clothing dried illegally, it is possible to determine whether clothing is the clothing dried illegally through multiple frames of images. If the number of violations of the target detection object in the multiple frames of images is determined to be large (for example, the detection state count value of clothing is greater than or equal to the fourth preset threshold), it is indicated that the clothing is the clothing dried illegally, rather than clothing worn by a pedestrian, and it can be determined that the illegal drying of the clothing exist in the region to be detected.

Figure 9:
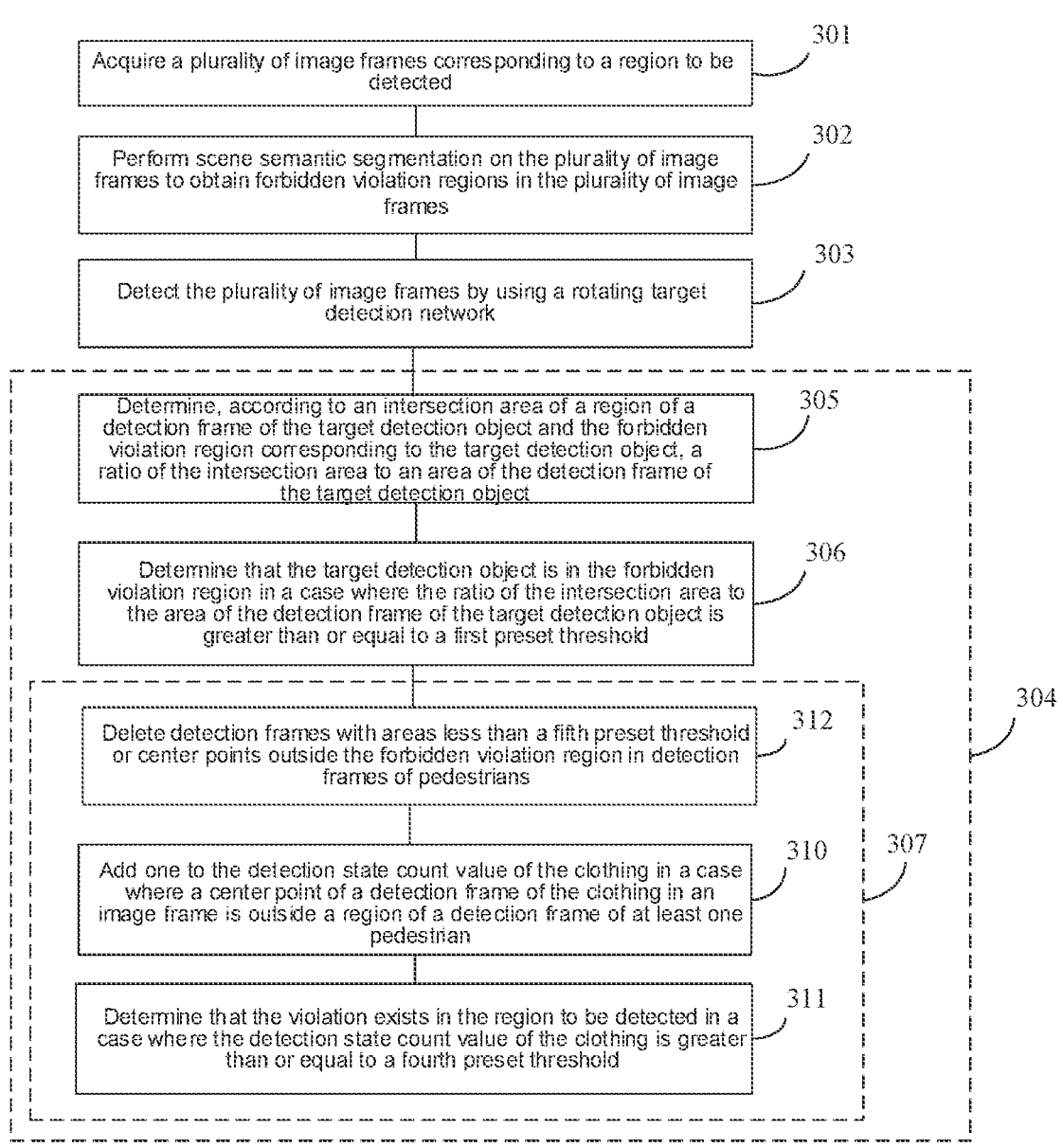
FIG. 9 is yet another flowchart of a method for detecting violations, in accordance with some embodiments.

In some embodiments, as shown in FIG. 9, in addition to steps 310 and 311, step 307 may further include step 312, which may be executed before step 310.

In step 312, detection frames with areas less than the fifth preset threshold or center points outside the forbidden violation region in detection frames of pedestrians are deleted.

The area of the detection frame of the pedestrian is less than the fifth preset threshold or the center point of the detection frame of the pedestrian is outside the forbidden violation region, which includes: the pedestrian in the image frame being incomplete in the body, far away from the camera, or not in the forbidden violation region. In the case where the area of the detection frame of the pedestrian is less than the fifth preset threshold or the center point of the detection frame of the pedestrian is outside the forbidden violation region, the clothing worn by the pedestrian cannot influence the detection of the clothing dried illegally, so that the detection frames of these pedestrians can be deleted. Pedestrians who meet at least one of the two situations are not involved in the detection of the clothing dried illegally and are therefore deleted.

In order to improve the speed and accuracy of detecting the clothing dried illegally, detection frames of pedestrians that are not involved in the detection of the clothing dried illegally in the image frames (e.g., a detection frame of a pedestrian with a relatively small area and a detection frame of a pedestrian with a center point not in the forbidden violation region in the image frames) may be deleted, and detection frame(s) of pedestrian(s) that are involved in the detection of the clothing dried illegally in the image frames (e.g., a detection frame of a pedestrian with a relatively large area and a detection frame of a pedestrian with a center point in the forbidden violation region in the image frames) may be retained. The retained detection frame of the pedestrian is the detection frame of at least one pedestrian in step 310. Then, by step 310, it is determined whether the center point of the detection frame of the clothing is in the retained detection frame region of at least one pedestrian, and whether the clothing is the clothing worn by the pedestrian or the illegal clothing.

Figure 10:
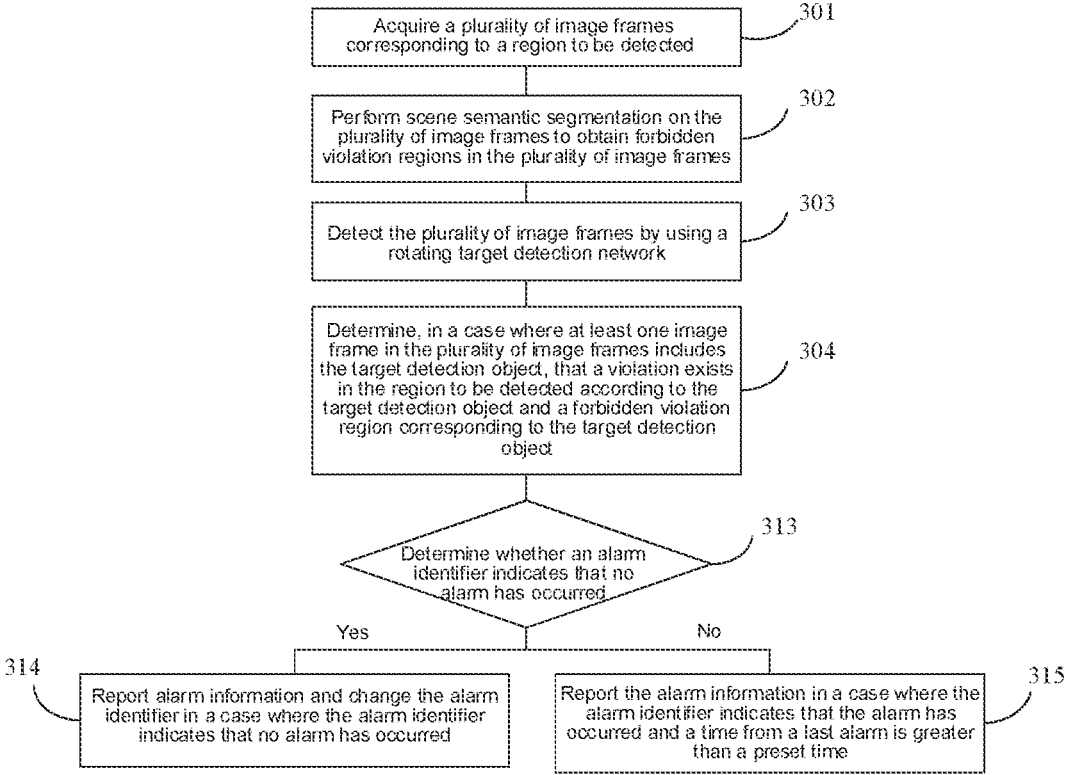
FIG. 10 is yet another flowchart of a method for detecting violations, in accordance with some embodiments.

In some embodiments, in the case where it is determined that the violation exists in the region to be detected, as shown in FIG. 10, the method may further include steps 313 to 315 in addition to the above steps 301 to 304.

In step 313, it is determined whether an alarm identifier indicates that no alarm has occurred.

The alarm identifier is used to indicate whether no alarm has occurred, and may be represented by a Boolean value or number.

In an example where the alarm identifier is represented by the Boolean value, when the alarm identifier is true, it indicates that the alarm has occurred; and when the alarm identifier is false, it indicates that no alarm has occurred. In an example where the alarm identifier is represented by the number, when the alarm identifier is 1, it indicates that the alarm has occurred; and when the alarm identifier is 0, it indicates that no alarm has occurred. The specific value of the alarm identifier indicating whether the alarm occurs is not limited in the present disclosure.

In step 314, alarm information is reported and the alarm identifier is changed in the case where the alarm identifier indicates that no alarm has occurred.

For example, the alarm identifier is false, it indicates that no alarm has occurred; the alarm information is reported, and the alarm identifier is changed to true. For another example, the alarm identifier is 0, it indicates that no alarm has occurred; the alarm information is reported, and the alarm identifier is changed to 1.

In step 315, the alarm information is reported in a case where the alarm identifier indicates that the alarm has occurred and a time from the last alarm is greater than a preset time.

For example, the alarm identifier is true or 1, it indicates that the alarm has occurred; the time difference between the current time and the last alarm time is calculated, and if the time difference between the current time and the last alarm time is greater than the preset time, alarm information is reported.

In some embodiments, the actions of reporting the alarm information in steps 314 and 315 described above may be performed by the transmission module 14 in the detection system shown in FIG. 1.

In some embodiments, the detection system may further statistically analyze regions where alarms frequently occur over a period of time (e.g., one month) based on alarm records, and send a 'warning board set' prompt to the property management center.

Figure 11:
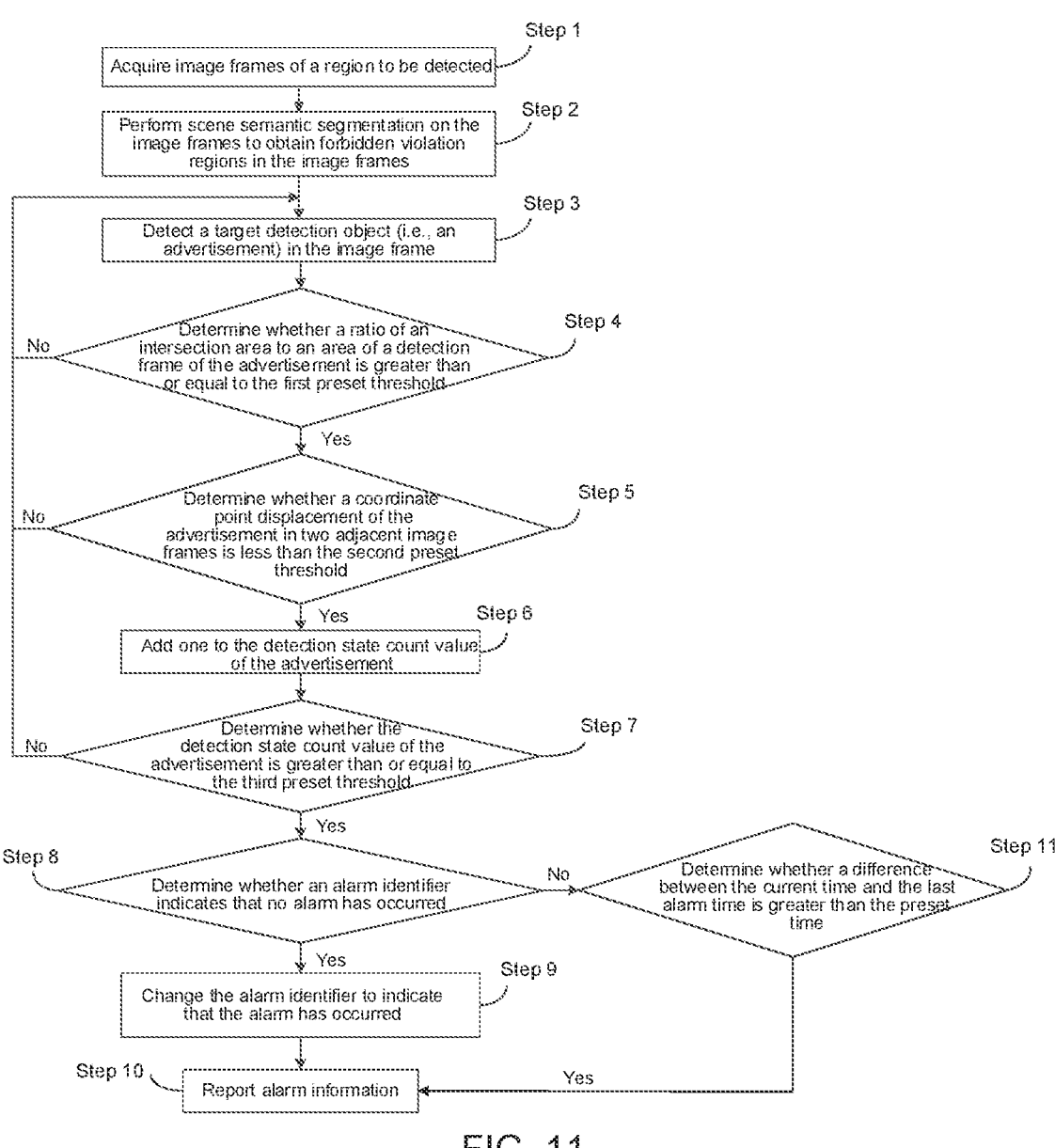
FIG. 11 is a flowchart of a method for detecting an advertisement posted illegally, in accordance with some embodiments.

Some embodiments of the present disclosure provide a method for detecting violations, and the detection method is used to detect whether advertisements are illegally posted. As shown in FIG. 11, the detection method includes steps 1 to 11.

In step 1, image frames of a region to be detected are acquired.

In step 2, scene semantic segmentation is performed on the image frames to obtain forbidden violation regions in the image frames.

When an angle of a camera is unchanged, the scene semantic segmentation may be performed on the image frames shot by the camera once. After the angle of the camera changes, the scene semantic segmentation may be performed again on image frames of the region to be detected shot by the camera once.

In step 3, a target detection object (i.e., an advertisement) in the image frame is detected.

In step 4, it is determined whether a ratio of an intersection area to an area of a detection frame of the advertisement is greater than or equal to the first preset threshold.

The intersection area is an intersection area of the detection frame of the advertisement and a forbidden region corresponding to the advertisement.

If the ratio of the intersection area to the area of the detection frame of the advertisement is greater than or equal to the first preset threshold, step 5 is performed sequentially. If the ratio of the intersection area to the area of the detection frame of the advertisement is less than the first preset threshold, step 3 is performed repeatedly.

In step 5, it is determined whether a coordinate point displacement of the advertisement in two adjacent image frames is less than the second preset threshold.

If the coordinate point displacement of the advertisement in the two adjacent image frames is less than the second preset threshold, step 6 is performed sequentially. If the coordinate point displacement of the advertisement in the two adjacent image frames is greater than or equal to the second preset threshold, step 3 is performed repeatedly.

In step 6, the detection state count value of the advertisement is added by one.

In step 7, it is determined whether the detection state count value of the advertisement is greater than or equal to the third preset threshold.

If the detection state count value of the advertisement is greater than or equal to the third preset threshold, step 8 is performed sequentially. If the detection state count value of the advertisement is less than the third preset threshold, step 3 is repeated.

In step 8, it is determined whether an alarm identifier indicates that no alarm has occurred.

If the alarm identifier indicates that no alarm has occurred, steps 9 and 10 are performed sequentially. If the alarm identifier indicates that the alarm has occurred, step 11 is performed sequentially.

In step 9, the alarm identifier is changed to indicate that the alarm has occurred.

In step 10, alarm information is reported.

In some embodiments, the alarm identifier is changed to indicate that the alarm has occurred, and then the alarm information may be reported after a first detected information is reported.

In step 11, it is determined whether a difference between the current time and the last alarm time is greater than the preset time.

If the difference between the current time and the last alarm time is greater than the preset time, step 10 is performed sequentially.

Figure 12:
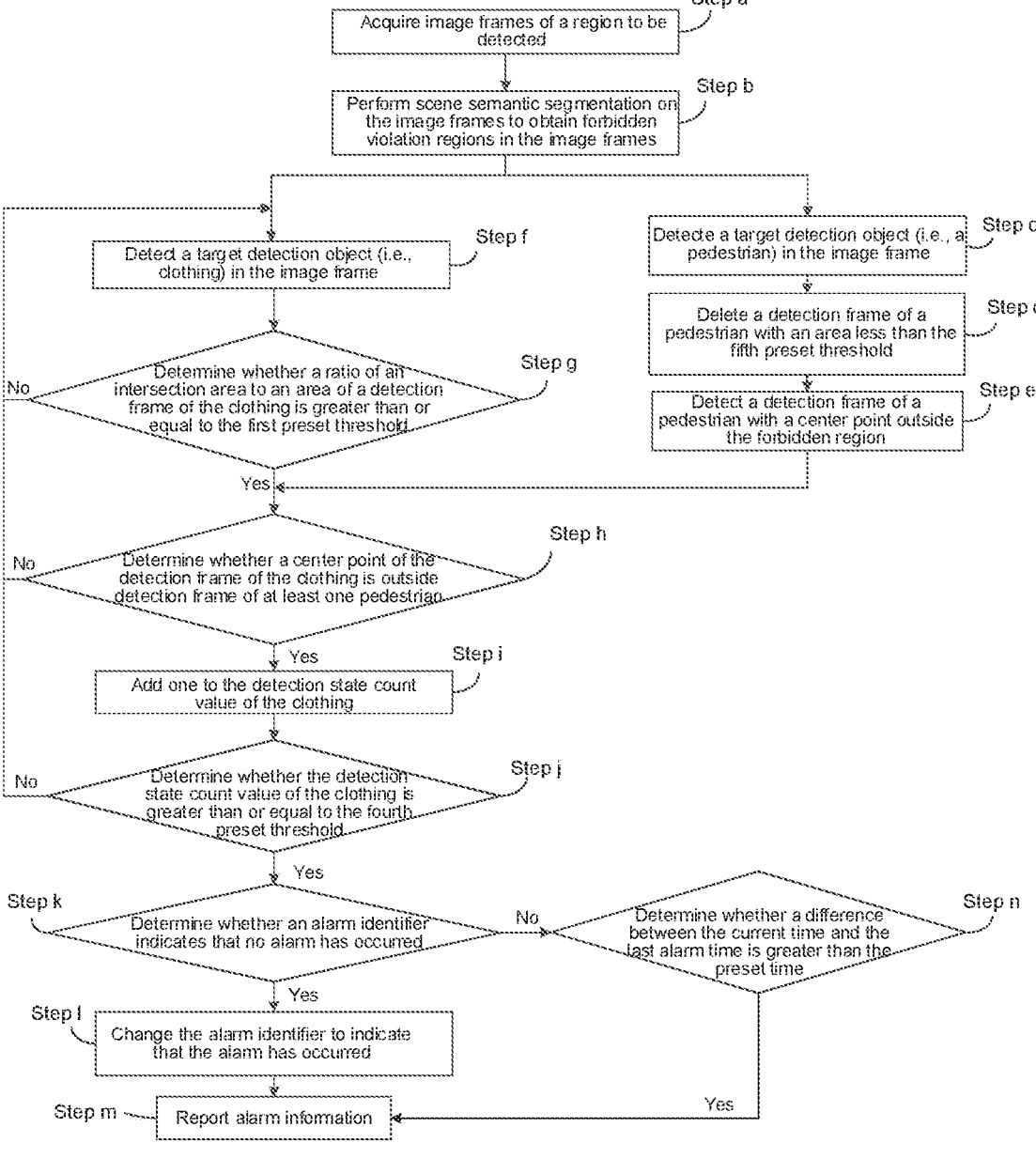
FIG. 12 is a flowchart of a method for detecting clothing dried illegally, in accordance with some embodiments.

Some embodiments of the present disclosure provide another method for detecting violations, and the detection method is used to detect whether clothing is illegally dried. As shown in FIG. 12, the detection method includes steps a to n.

In step a, image frames of a region to be detected are acquired.

In step b, scene semantic segmentation is continuously performed on the image frames to obtain forbidden violation regions in the image frames.

When an angle of a camera is unchanged, the scene semantic segmentation may be continuously performed on the image frames shot by the camera once. After the angle of the camera changes, the scene semantic segmentation may be continuously performed again on image frames of the region to be detected shot by the camera once.

In step c, a target detection object (i.e., a pedestrian) in the image frame is detected.

In step d, a detection frame of a pedestrian with an area less than the fifth preset threshold is deleted.

In step e, a detection frame of a pedestrian with a center point outside the forbidden region is detected. And step h is performed sequentially.

In step f, a target detection object (i.e., clothing) in the image frame is detected.

In step g, it is determined whether a ratio of an intersection area to an area of a detection frame of the clothing is greater than or equal to the first preset threshold.

The intersection area is an intersection area of the detection frame of the clothing and a forbidden region corresponding to the clothing.

If the ratio of the intersection area to the area of the detection frame of the clothing is greater than or equal to the first preset threshold, step h is performed sequentially. If the ratio of the intersection area to the area of the detection frame of the clothing is less than the first preset threshold, step f is performed repeatedly.

In step h, it is determined whether a center point of the detection frame of the clothing is outside detection frame of at least one pedestrian.

In some embodiments, an area of the detection frame of the at least one pedestrian is greater than or equal to the fifth preset threshold, and a center point of the detection frame of the at least one pedestrian is in the forbidden violation region corresponding to the target detection object.

If the center point of the detection frame of the clothing is outside the detection frame of any pedestrian, step i is performed sequentially. If the center point of the detection frame of the clothing is in all pedestrian detection frame(s), step f is performed repeatedly.

In step i, the detection state count value of the clothing is added by one.

In step j, it is determined whether the detection state count value of the clothing is greater than or equal to the fourth preset threshold.

If the detection state count value of the clothing is greater than or equal to the fourth preset threshold, step k is performed sequentially. If the detection state count value of the clothing is less than the fourth preset threshold, step f is repeated.

In step k, it is determined whether an alarm identifier indicates that no alarm has occurred.

If the alarm identifier indicates that no alarm has occurred, steps l and m are performed sequentially. If the alarm identifier indicates that the alarm has occurred, step n is performed sequentially.

In step l, the alarm identifier is changed to indicate that the alarm has occurred.

In some embodiments, the alarm identifier is changed to indicate that the alarm has occurred, and then the alarm information may be reported after a first detected information is reported.

In step m, alarm information is reported.

In some embodiments, the alarm identifier is changed to indicate that the alarm has occurred, and then the alarm information may be reported after a first detected information is reported.

In step n, it is determined whether a difference between the current time and the last alarm time is greater than the preset time.

If the difference between the current time and the last alarm time is greater than the preset time, step m is performed sequentially.

It should be noted that, values of the first preset threshold, the second preset threshold, the third preset threshold, the fourth preset threshold, the fifth preset threshold, and the preset time are not limited in the present disclosure. For a same preset threshold (e.g., the first preset threshold), one or more values may be set when different violations are detected. For example, the first preset threshold may be set to 0.9 when advertisements posted illegally are detected, and may be set to 0.8 when clothing dried illegally is detected. That is, the first preset threshold may include multiple values when different violations are detected.

Figure 13:
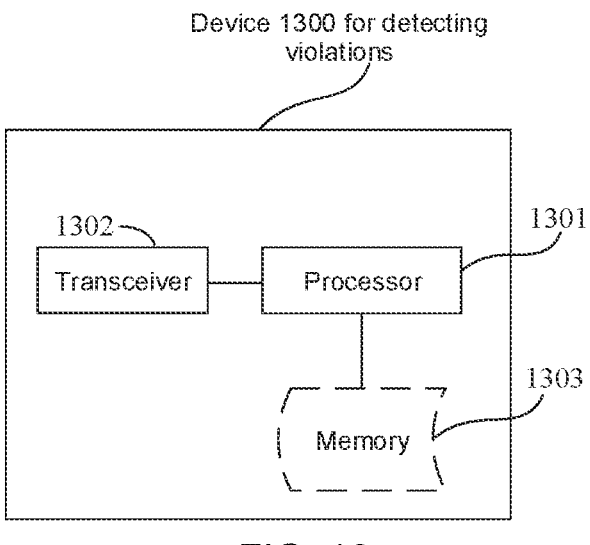
FIG. 13 is a structural diagram of a device for detecting violations, in accordance with some embodiments.

Some embodiments of the present disclosure provide a device for detecting violations. As shown in FIG. 13, the device 1300 for detecting violations includes a processor 1301 and a transceiver 1302.

The transceiver 1302 is configured to acquire a plurality of image frames corresponding to a region to be detected.

The processor 1301 is configured to: perform scene semantic segmentation on the plurality of image frames to obtain forbidden violation regions in the plurality of image frames; detect the plurality of image frames by using a rotating target detection network; and in a case where at least one image frame in the plurality of image frames includes a target detection object, determine that a violation exists in the region to be detected according to the target detection object and a forbidden violation region corresponding to the target detection object.

The target detection object includes at least one of an advertisement, clothing, or a pedestrian.

The processor 1301 is further configured to: determine, according to an intersection area of a region of a detection frame of the target detection object and the forbidden violation region corresponding to the target detection object, a ratio of the intersection area to an area of the detection frame of the target detection object; determine that the target detection object is in the forbidden violation region in a case where the ratio of the intersection area to the area of the detection frame of the target detection object is greater than or equal to the first preset threshold; and determine that the violation exists in the region to be detected according to a detection state count value of the target detection object.

The processor 1301 is further configured to: add one to the detection state count value of the target detection object in a case where a displacement of coordinate points of the target detection object in two adjacent image frames in the at least one image frame is less than the second preset threshold; and determine that the violation exists in the region to be detected in a case where the detection state count value of the target detection object is greater than or equal to the third preset threshold.

The processor 1301 is further configured to: in a case where a center point of a detection frame of clothing is outside a detection frame region of at least one pedestrian, add one to the detection state count value of the clothing; and in a case where the detection state count value of the clothing is greater than or equal to the fourth preset threshold, determine that the violation exists in the region to be detected.

In some embodiments, an area of the detection frame of the at least one pedestrian is greater than or equal to the fifth preset threshold, and a center point of the detection frame of the at least one pedestrian is in the forbidden violation region corresponding to the target detection object.

The processor 1301 is further configured to delete detection frames with areas less than the fifth preset threshold or center points outside the forbidden violation region in detection frames of pedestrians.

In some embodiments, the rotating target detection network includes a Backbone network, a Neck network and a Head network. An output of the Head network includes a predicted rotation angle of the detection frame.

The processor 1301 is configured to: preprocess the image frames, and extract feature data of the image frames through the Backbone network and the Neck network; and input the feature data of the image frames into the Head network to obtain a detection result of the target detection object. The detection result of the target detection object includes at least one of the detection frame of the target detection object, the region coordinates of the detection frame, the predicted rotation angle of the detection frame, and the category of the target detection object.

The transceiver 1302 is further configured to: report alarm information and change an alarm identifier in a case where the alarm identifier indicates that no alarm has occurred; and report the alarm information in a case where the alarm identifier indicates that the alarm has occurred and a time from the last alarm is greater than the preset time.

The transceiver 1302 may be a communication interface, such as an input-output interface. For example, the device 1300 for detecting violations is a chip, and the transceiver 1302 is the communication interface. The transceiver 1302 may also be a radio frequency unit. For example, in a case where the device 1300 for detecting violations is a terminal device, the transceiver 1302 may be the radio frequency unit connected to an antenna.

In some embodiments, the device 1300 for detecting violations may further include a memory 1303, and the memory 1303 is used to store program codes and data corresponding to any method for detecting violations provided by the device 1300 for detecting violations performing the above content. The memory 1303 may be a read-only memory (ROM) or a static storage device of other type that may store static information and instructions, or a random access memory (RAM).

In some embodiments, the device 1300 for detecting violations may be the device 20 for detecting violations shown in FIG. 2; and for functional description of corresponding components in FIG. 13, reference may be made to the description of all relevant contents of the components involved in FIG. 2, and which will not be described here again.

Some embodiments of the present disclosure provide a computer-readable storage medium (e.g., a non-transitory computer-readable storage medium), and the computer-readable storage medium stores therein computer program instructions that, when run on a computer (e.g., the device for detecting violations), cause the computer to execute the method for detecting violations in any of the above embodiments.

For example, the computer-readable storage medium may include, but is not limited to, a magnetic storage device (e.g., a hard disk, a floppy disk or a magnetic tape), an optical disk (e.g., a compact disk (CD), a digital versatile disk (DVD)), a smart card and a flash memory device (e.g., an erasable programmable read-only memory (EPROM), a card, a stick or a key driver). Various computer-readable storage medium described in the embodiments of the present disclosure may represent one or more devices and/or other machine-readable storage medium for storing information. The term "machine-readable storage medium" may include, but is not limited to, wireless channels and various other medium capable of storing, containing and/or carrying instructions and/or data.

Some embodiments of the present disclosure further provide a computer program product. For example, the computer program product is stored on non-transitory computer-readable storage medium. The computer program product includes computer program instructions that, when executed on a computer (the device for detecting violations), cause the computer to perform the method for detecting violations as described in the above embodiments.

Some embodiments of the present disclosure further provide a computer program. The computer program, when executed on a computer, causes the computer to perform the method for detecting violations as described in the above embodiments.

Beneficial effects of the computer-readable storage medium, computer program product and computer program described above are the same as the beneficial effects of the method for detecting violations described in some of the above embodiments, which will not be repeated here.

The foregoing descriptions are merely specific implementation manners of the present disclosure, but the protection scope of the present disclosure is not limited thereto, any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A method for detecting violations, comprising:

acquiring a plurality of image frames corresponding to a region to be detected;

performing scene semantic segmentation on the plurality of image frames to obtain forbidden violation regions in the plurality of image frames;

detecting the plurality of image frames by using a rotating target detection network, wherein the rotating target detection network is used for detecting whether an image frame includes a target detection object; and determining, in a case where at least one image frame in the plurality of image frames includes the target detection object, that a violation exists in the region to be detected according to the target detection object and a forbidden violation region corresponding to the target detection object;

wherein determining that the violation exists in the region to be detected according to the target detection object and the forbidden violation region corresponding to the target detection object includes:

determining, according to an intersection area of a region of a detection frame of the target detection object and the forbidden violation region corresponding to the target detection object, a ratio of the intersection area to an area of the detection frame of the target detection object;

determining that the target detection object is in the forbidden violation region in a case where the ratio of the intersection area to the area of the detection frame of the target detection object is greater than or equal to a first preset threshold; and determining that the violation exists in the region to be detected according to a detection state count value of the target detection object;

wherein the target detection object includes clothing and a pedestrian, and determining that the violation exists in the region to be detected according to the detection state count value of the target detection object includes:

adding one to a detection state count value of the clothing in a case where a center point of a detection frame of the clothing is outside a region of a detection frame of at least one pedestrian; and determining that the violation exists in the region to be detected in a case where the detection state count value of the clothing is greater than or equal to a fourth preset threshold.

2. The method according to claim 1, wherein the target detection object further includes an advertisement.

3. The method according to claim 2, wherein in a case where the target detection object further includes the advertisement, determining that the violation exists in the region to be detected according to the detection state count value of the target detection object further includes:

adding one to the detection state count value of the target detection object in a case where a displacement of coordinate points of the target detection object in two adjacent image frames in the at least one image frame is less than a second preset threshold; and determining that the violation exists in the region to be detected in a case where the detection state count value of the target detection object is greater than or equal to a third preset threshold.

4. The method according to claim 1, wherein an area of the detection frame of the at least one pedestrian is greater than or equal to a fifth preset threshold, and a center point of the detection frame of the at least one pedestrian is in the forbidden violation region corresponding to the target detection object.

5. The method according to claim 1, further comprising:
deleting detection frames with areas less than a fifth preset threshold or center points outside the forbidden violation region in detection frames of pedestrians.

6. The method according to claim 1, wherein the rotating target detection network includes a Backbone network, a Neck network and a Head network, wherein an output of the Head network includes a predicted rotation angle of a detection frame.

7. The method according to claim 6, wherein detecting the plurality of image frames by using the rotating target detection network includes:
preprocessing the plurality of image frames, and extracting feature data of the plurality of image frames through the Backbone network and the Neck network; and
inputting the feature data of the plurality of image frames into the Head network to obtain a detection result of the target detection object, wherein the detection result of the target detection object includes at least one of the detection frame of the target detection object, region coordinates of the detection frame, the predicted rotation angle of the detection frame, or a category of the target detection object.

8. The method according to claim 1, further comprising:
reporting alarm information and changing an alarm identifier in a case where the alarm identifier indicates that no alarm has occurred; and
reporting the alarm information in a case where the alarm identifier indicates that the alarm has occurred and a time from a last alarm is greater than a preset time.

9. A device for detecting violations, comprising: a processor and a transceiver, wherein
the transceiver is configured to acquire a plurality of image frames corresponding to a region to be detected; and
the processor is configured to:
perform scene semantic segmentation on the plurality of image frames to obtain forbidden violation regions in the plurality of image frames;
detect the plurality of image frames by using a rotating target detection network; and
determine, in a case where at least one image frame in the plurality of image frames includes a target detection object, that a violation exists in the region to be detected according to the target detection object and a forbidden violation region corresponding to the target detection object;
wherein the processor is further configured to:
determine, according to an intersection area of a region of a detection frame of the target detection object and the forbidden violation region corresponding to the target detection object, a ratio of the intersection area to an area of the detection frame of the target detection object;
determine that the target detection object is in the forbidden violation region in a case where the ratio of the intersection area to the area of the detection frame of the target detection object is greater than or equal to a first preset threshold; and
determine that the violation exists in the region to be detected according to a detection state count value of the target detection object;

wherein the target detection object includes clothing and a pedestrian, and the processor is further configured to:
add one to the detection state count value of the clothing in a case where a center point of a detection frame of the clothing is outside a region of a detection frame of at least one pedestrian; and
determine that the violation exists in the region to be detected in a case where the detection state count value of the clothing is greater than or equal to a fourth preset threshold.

10. The device according to claim 9, wherein the target detection object further includes an advertisement.

11. The device according to claim 10, wherein in a case where the target detection object further includes the advertisement, the processor is further configured to:
add one to the detection state count value of the target detection object in a case where a displacement of coordinate points of the target detection object in two adjacent image frames in the at least one image frame is less than a second preset threshold; and
determine that the violation exists in the region to be detected in a case where the detection state count value of the target detection object is greater than or equal to a third preset threshold.

12. The device according to claim 9, wherein an area of the detection frame of the at least one pedestrian is greater than or equal to a fifth preset threshold, and a center point of the detection frame of the at least one pedestrian is in the forbidden violation region corresponding to the target detection object.

13. The device according to claim 9, wherein the processor is further configured to:
delete detection frames with areas less than a fifth preset threshold or center points outside the forbidden violation region in detection frames of pedestrians.

14. The device according to claim 9, wherein the rotating target detection network includes a Backbone network, a Neck network and a Head network; and an output of the Head network includes a predicted rotation angle of a detection frame.

15. The device according to claim 14, wherein the processor is further configured to:
preprocess the plurality of image frames, and extract feature data of the plurality of image frames through the Backbone network and the Neck network;
input the feature data of the plurality of image frames into the Head network to obtain a detection result of the target detection object, wherein the detection result of the target detection object includes at least one of the detection frame of the target detection object, region coordinates of the detection frame, the predicted rotation angle of the detection frame, or a category of the target detection object.

16. A non-transitory computer-readable storage medium, wherein the computer-readable storage medium stores computer program instructions that, when executed by a detection device, implement the method for detecting violations according to claim 1.

17. A method for detecting violations, comprising:
acquiring a plurality of image frames corresponding to a region to be detected;
performing scene semantic segmentation on the plurality of image frames to obtain forbidden violation regions in the plurality of image frames;
detecting the plurality of image frames by using a rotating target detection network, wherein the rotating target detection network is used for detecting whether an image frame includes a target detection object; and determining, in a case where at least one image frame in the plurality of image frames includes the target detection object, that a violation exists in the region to be detected according to the target detection object and a forbidden violation region corresponding to the target detection object;

wherein determining that the violation exists in the region to be detected according to the target detection object and the forbidden violation region corresponding to the target detection object includes:

determining, according to an intersection area of a region of a detection frame of the target detection object and the forbidden violation region corresponding to the target detection object, a ratio of the intersection area to an area of the detection frame of the target detection object;

determining that the target detection object is in the forbidden violation region in a case where the ratio of the intersection area to the area of the detection frame of the target detection object is greater than or equal to a first preset threshold; and determining that the violation exists in the region to be detected according to a detection state count value of the target detection object;

wherein the target detection object includes an advertisement, and determining that the violation exists in the region to be detected according to the detection state count value of the target detection object includes:

adding one to the detection state count value of the target detection object in a case where a displacement of coordinate points of the target detection object in two adjacent image frames in the at least one image frame is less than a second preset threshold; and determining that the violation exists in the region to be detected in a case where the detection state count value of the target detection object is greater than or equal to a third preset threshold.

* * * * *